United States Patent
Eklund et al.

(10) Patent No.: US 7,773,864 B2
(45) Date of Patent: Aug. 10, 2010

(54) SLICING INTERACTIVE GRAPHIC DATA IN DISC AUTHORING

(75) Inventors: Don Eklund, Yorba Linda, CA (US); Sumit Malik, Pasadena, CA (US); Raja Sahi, Los Angeles, CA (US); Tommy Choy, Lakewood, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 285 days.

(21) Appl. No.: 11/467,885

(22) Filed: Aug. 28, 2006

(65) Prior Publication Data

US 2007/0050717 A1 Mar. 1, 2007

Related U.S. Application Data

(60) Provisional application No. 60/712,664, filed on Aug. 29, 2005, provisional application No. 60/712,684, filed on Aug. 29, 2005.

(51) Int. Cl.
*H04N 5/00* (2006.01)

(52) U.S. Cl. .................................. 386/125; 386/126

(58) Field of Classification Search .................. 386/1, 386/45–46, 97, 125–126
See application file for complete search history.

(56) References Cited

U.S. PATENT DOCUMENTS

| | | | |
|---|---|---|---|
| 3,088,996 A | 5/1963 | Carter | |
| 6,404,711 B1 | 6/2002 | Kato | |
| 6,453,459 B1 | 9/2002 | Brodersen et al. | |
| 6,807,363 B1 | 10/2004 | Abiko et al. | |
| 2002/0112226 A1 | 8/2002 | Brodersen et al. | |
| 2002/0174438 A1 | 11/2002 | Cleary et al. | |
| 2003/0193520 A1 | 10/2003 | Detzel | |
| 2004/0167916 A1 | 8/2004 | Basso et al. | |
| 2004/0210896 A1 | 10/2004 | Chou et al. | |
| 2004/0220791 A1 | 11/2004 | Lamkin et al. | |
| 2004/0240360 A1 | 12/2004 | Kim et al. | |
| 2005/0013593 A1 | 1/2005 | Jung et al. | |
| 2005/0114909 A1 | 5/2005 | Mercier | |
| 2005/0155058 A1 | 7/2005 | Jung et al. | |
| 2005/0185929 A1 | 8/2005 | Kang et al. | |
| 2006/0165388 A1 | 7/2006 | Uesaka et al. | |

OTHER PUBLICATIONS

International Search Report/Written Opinion issued in PCT/US06/26058 on Jun. 27, 2008.
International Search Report/ Written Opinion issued in PCT/US06/34191 on Jul. 14, 2008.
International Search Report/ Written Opinion issued in PCT/US06/34190 on Jul. 8, 2008.

(Continued)

*Primary Examiner*—Thai Tran
*Assistant Examiner*—Nigar Chowdhury
(74) *Attorney, Agent, or Firm*—Procopio, Cory, Hargreaves & Savitch LLP

(57) ABSTRACT

Authoring a Blu-ray Disc including defining interactive regions within a composition with buttons and associating a command with the button; and automatically defining non-interactive regions within the composition with buttons, wherein the non-interactive regions are not associated with any command.

17 Claims, 15 Drawing Sheets

OTHER PUBLICATIONS

International Search Report and Written Opinion issued in PCT/US2006/34316 on Aug. 2, 2007.
International Search Report and Written Opinion issued in PCT/US2006/33915 on Apr. 12, 2007.
International Search Report and Written Opinion issued in PCT/US06/34309 on Apr. 9, 2007.
International Search Report and Written Opinion issued in PCT/US2006/34306 on Aug. 29, 2007.
International Search Report and Written Opinion issued in PCT/US06/34307 on Oct. 18, 2007.

SLICING INTERACTIVE GRAPHIC DATA IN DISC AUTHORING

RELATED APPLICATION

This application claims the benefit of priority of U.S. Provisional Patent Application Ser. No. 60/712,664, entitled "Disc Authoring" and U.S. Provisional Patent Application Ser. No. 60/712,684, entitled "Abstractions in Disc Authoring" both filed Aug. 29, 2005. This application is also related to U.S. patent application Ser. No. 11/467,896 entitled "Abstractions in Disc Authoring", filed on the same day as this application. The disclosures of the above-referenced patent applications are hereby incorporated by reference.

BACKGROUND

The present invention relates generally to disc authoring and, more particularly, to slicing interactive graphic data in authoring optical discs such as Blu-ray Discs.

A media authoring system is typically used to generate articles of media that are compliant with a particular standard. For example, a Digital Versatile Disc (DVD) authoring system is used to generate data, such as audio and video data and information used to present and access the audio and video data, on a DVD. The data on the disc is stored according to standards defined for DVD. Similarly, a Blu-ray Disc (BD) authoring system is used to create optical discs storing information according to the standards defined for BD.

The BD Read Only Memory specification includes interactive graphics that allow a user to select options while viewing, or interacting, with the BD. Generating and implementing these interactive graphics can be burdensome to the disc author.

Therefore, there is a need for improved techniques for authoring interactive graphics for BD.

SUMMARY

Implementations of the present invention include systems and methods to implement techniques for disc authoring using interactive graphics, such as in authoring optical discs compliant with Blu-ray Disc.

In one implementation, a method for authoring a Blu-ray Disc includes defining interactive regions within a composition with buttons and associating a command with the button, and automatically defining non-interactive regions within the composition with buttons, wherein the non-interactive regions are not associated with any command.

In another implementation, a Blu-ray Disc authoring system includes defining interactive regions within a composition with buttons and commands associated with the buttons, and automatically defining non-interactive regions within the composition.

In yet another implementation, a method for defining an interactive graphic for a Blu-ray Disc includes identifying an interactive graphics display, identifying interactive regions within the display and associating a command with each respective interactive region, identifying non-interactive regions within the display, and automatically defining portions of the non-interactive regions into partitions, wherein the interactive and non-interactive regions comprise an interactive composition.

In another implementation, a computer program, stored in a computer-readable storage medium, for authoring a Blu-ray Disc, includes executable instructions that cause a computer to receive input defining interactive regions within a composition with buttons and associating a command with the button, and automatically define non-interactive regions within the composition with buttons, wherein the non-interactive regions are not associated with any command.

In still another implementation, a computer program, stored in a computer-readable storage medium, for authoring a Blu-ray Disc, includes executable instructions that cause a computer to: receive definitions identifying interactive regions within the display, and commands associated with each respective region; and identify non-interactive regions within the display and automatically define portions of the non-interactive regions into partitions, wherein the interactive and non-interactive regions comprise an interactive composition.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be understood in part by studying the accompanying drawings, in which like reference numerals refer to like parts, and in which.

DETAILED DESCRIPTION

As will be further described below, implementations of the present invention provide an efficient structure and configuration in authoring articles of media that are compliant with a particular standard. In one implementation, a Blu-ray Disc (BD) authoring system executes instructions to store information based on the BD standard specifications using interactive graphics. After reading this description it will become apparent to one skilled in the art how to implement the invention in various implementations and applications. However, although various implementations of the present invention will be described herein, it is understood that these implementations are presented by way of example only, and not limitation. As such, this detailed description of various implementations should not be construed to limit the scope or breadth of the present invention as set forth in the appended claims.

In one implementation, the BD Read Only Memory (BD-ROM) specification provides a number of data structures that needs to be defined on a BD in order for the disc to behave as desired. The BD-ROM specification defines BD Prerecorded and BD Recordable application formats.

Figure 1:
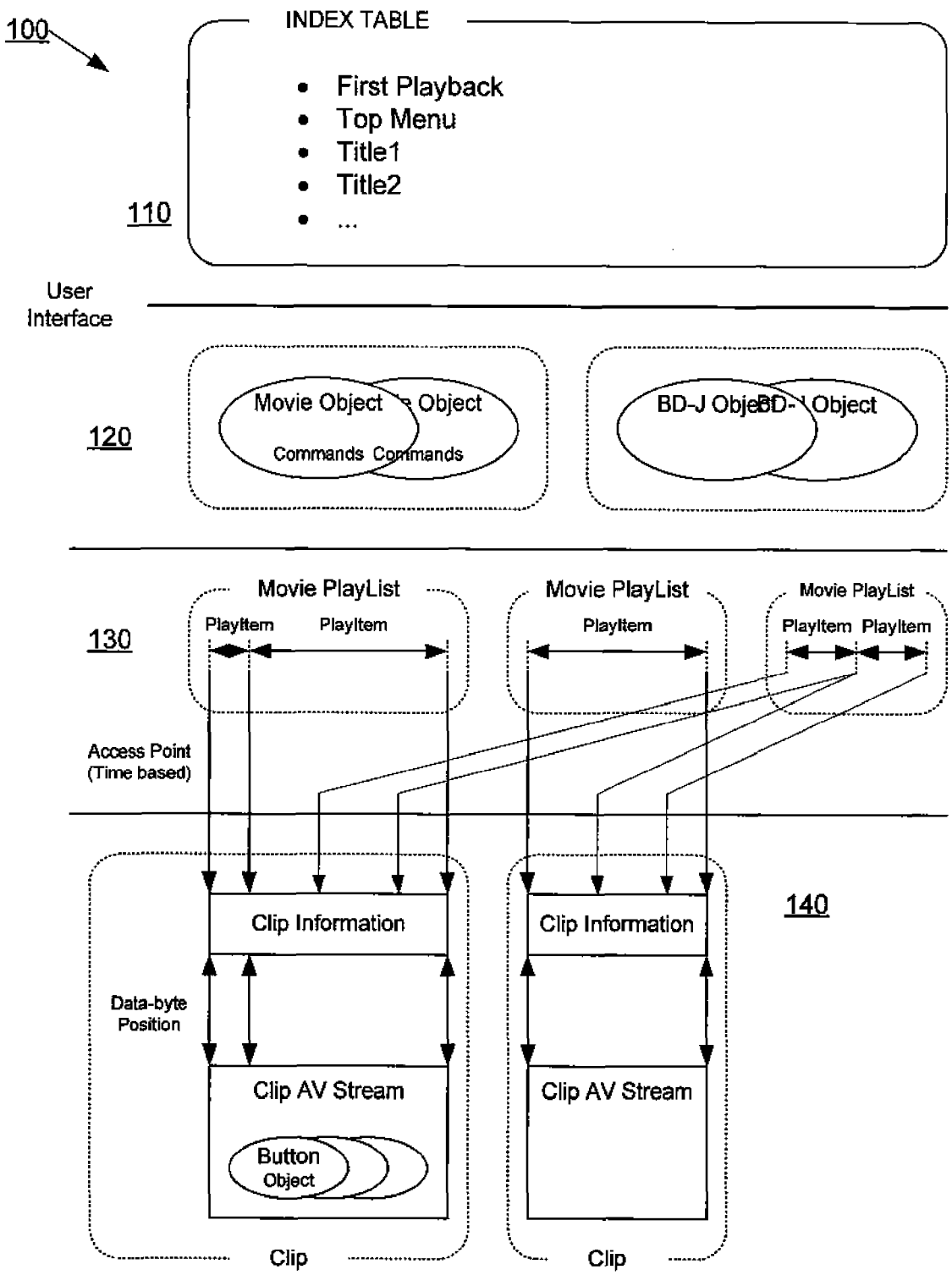
FIG. 1 provides a simplified overview of the BD-ROM data structure.

FIG. 1 provides a simplified overview of the BD-ROM data structure 100. In general, BD-ROM has four layers for managing AV stream files as follows: Index Table 110, Movie Object/BD-J Object 120, Playlist 130, and Clip 140.

Figure 2:
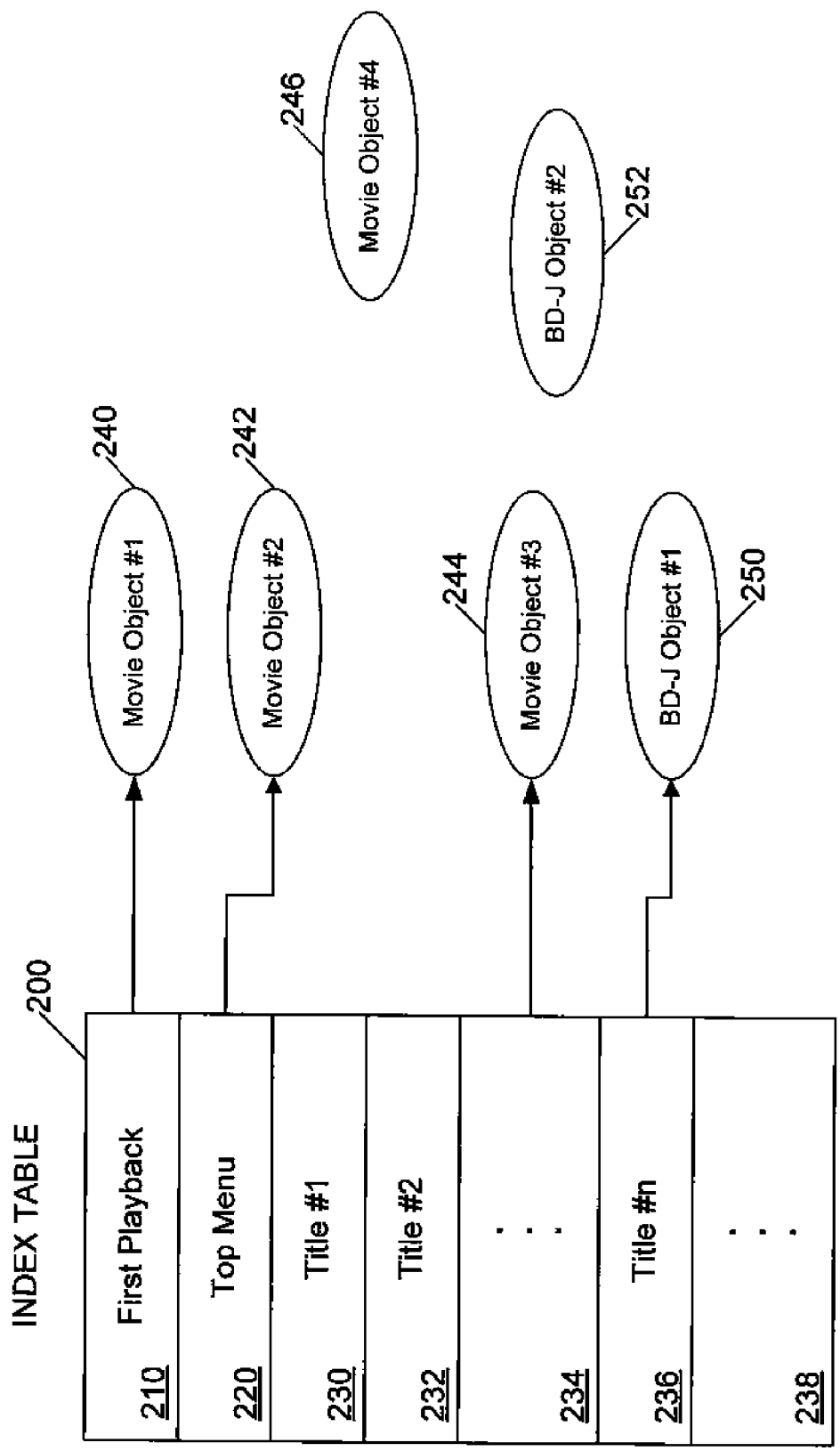
FIG. 2 shows Index Table, which is a top-level table structure that defines the Titles of a BD-ROM disc.

An example Index Table 200, shown in FIG. 2, is a top-level table structure that defines the Titles of a BD-ROM disc. A Title corresponds to any entry in the Index Table including First Playback 210, Top Menu 220, and Titles 230, 232, 234, 236, 238. First Playback 210 is used by content providers to perform automatic playback. Each Index Table entry links to either a Movie Object 240, 242, 244, 246 or BD-Java (BD-J) Object 250, 252. The disc player references this table whenever a title is to be executed (e.g. whenever the Title Search or Menu Call operation is called).

Figure 3:
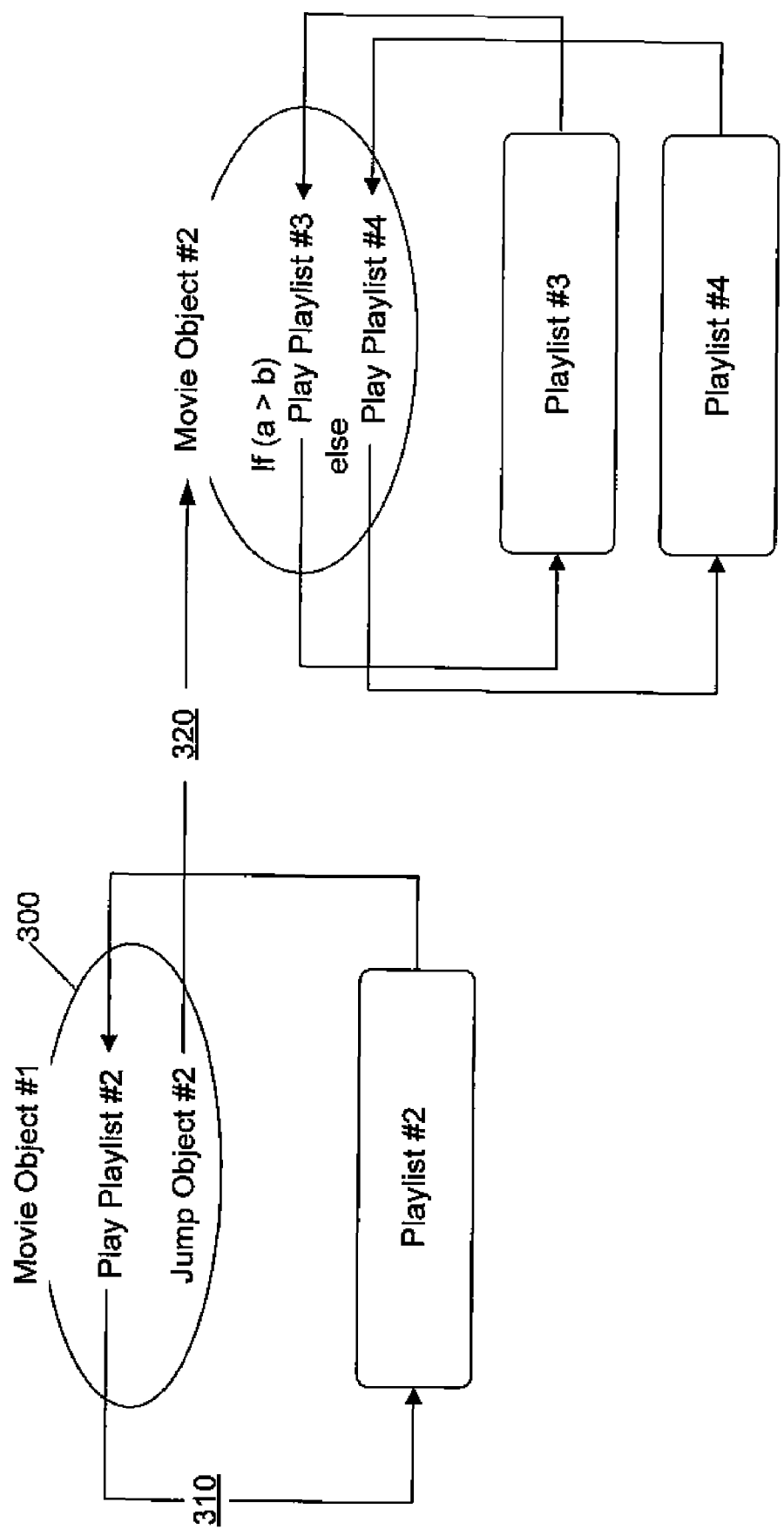
FIG. 3 illustrates one example of a Movie object including navigation commands that can launch Playlist playback or another Movie Object.

A Movie Object includes executable lines of codes or navigation commands which enables dynamic scenario description. Thus, as shown in FIG. 3, navigation commands in a Movie Object (e.g., 300) can launch Playlist playback 310 or another Movie Object 320. This enables the content providers to define a set of Movie Objects for managing playback of Playlists in accordance with a user's interaction and preferences.

When a Title associated with a BD-J Object in the Index Table on disc is selected, the corresponding application is automatically launched and its lifecycle is bound to the Title. A BD-J application is a Java Xlet which is controlled by the BD-ROM player's Application Manager through its Xlet interface. The Xlet interface has four states as follows: loaded, paused, active and destroyed. Once a BD-J application is destroyed, any resources allocated to it, such as memory and AV control, is released.

Figure 4:
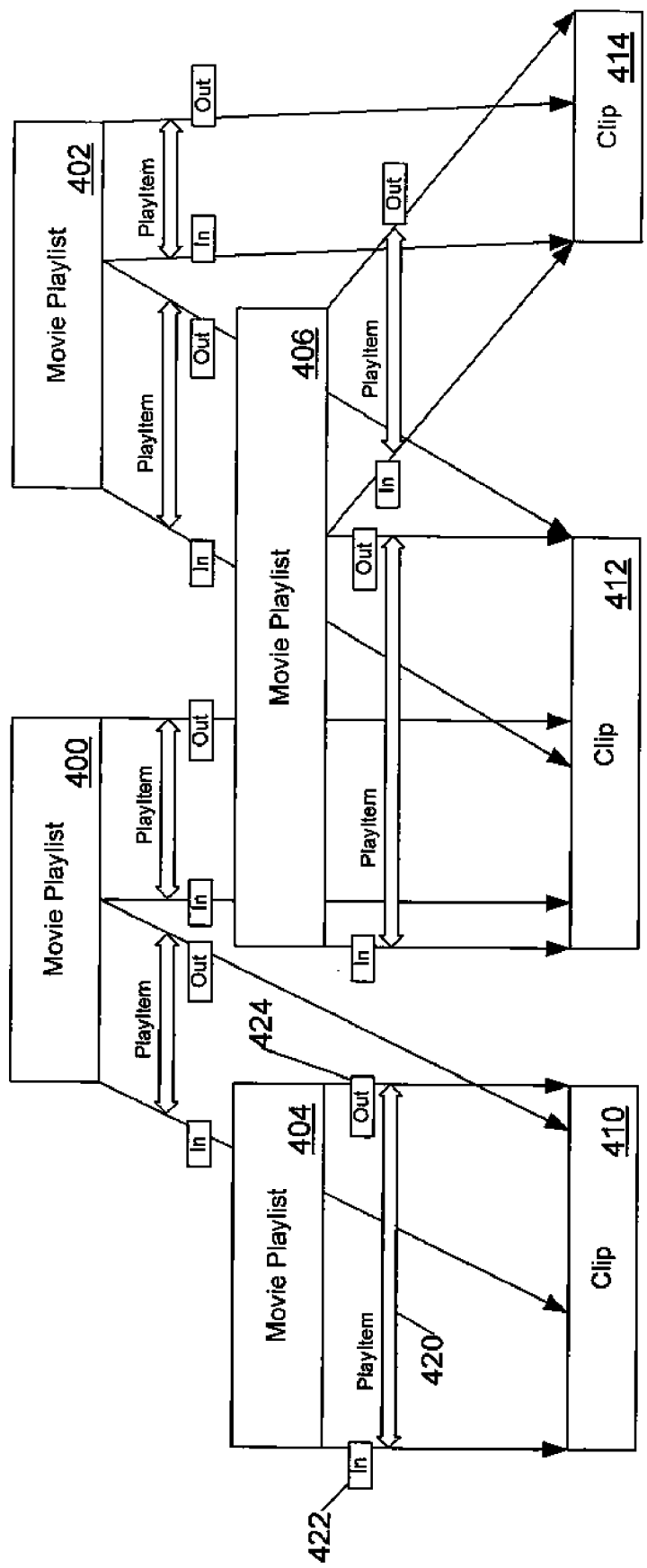
FIG. 4 illustrates one example of Playlists, which are a collection of playing intervals in the Clips that indicates which portion of the Clip to play and when to play the Clip.

A Playlist (i.e., "Movie Playlist") 400, 402, 404, 406, illustrated in FIG. 4, is a collection of playing intervals in the Clips 410, 412, 414 that indicates which portion of the Clip to play and when to play the Clip. One such playing interval is called a PlayItem (e.g., 420) and includes an IN-point (e.g., 422) and an OUT-point (e.g., 424), each of which refers to positions on a time axis of the Clip. The IN-point indicates a start point of a playing interval, and the OUT-point indicates an end point of the playing interval.

An AV stream file together with its associated database attributes is considered to be one object. The AV stream file is referred to as a Clip AV stream file, and the associated database attribute file is referred to as a Clip Information file. An object including the Clip AV stream file and its corresponding Clip information file is referred to as a Clip.

Figure 5:
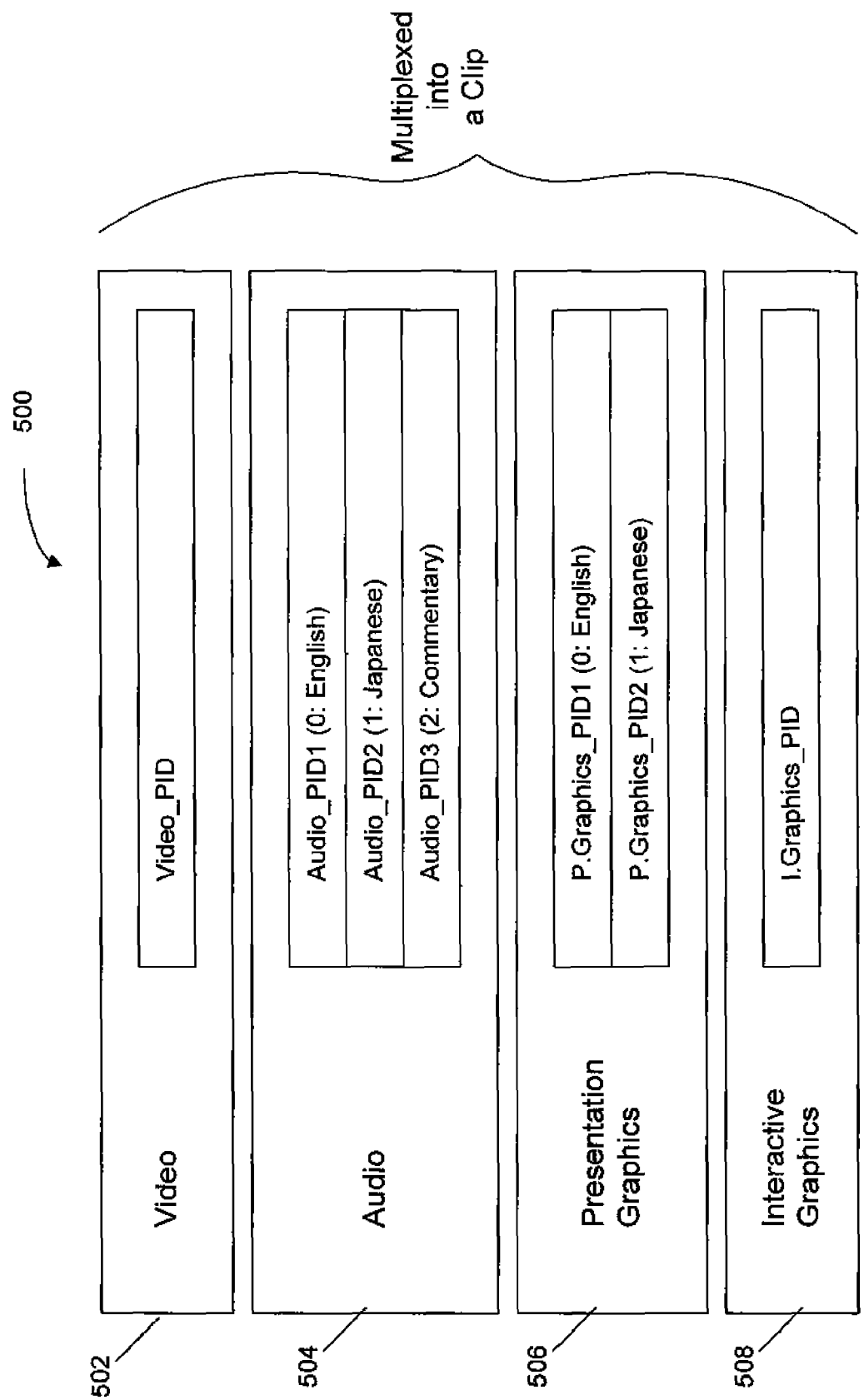
FIG. 5 is a block diagram of an example Clip.

FIG. 5 is a block diagram of an example Clip 500 including Clip AV stream. In the example of FIG. 5, the Clip 500 includes four types of streams, video streams 502, audio streams 504, presentation graphics streams 506, and interactive graphics streams 508. In other implementations, the Clip 500 can include different numbers of streams as well as different types of streams. For example, the Clip 500 can include a primary video stream, a secondary video stream, and additional graphics streams. The clip can also have fewer streams, for example, the Clip 500 may not include an audio stream, or a video stream, or graphic streams.

In BD authoring, abstractions represent objects that are presentation oriented. For example, following objects are abstractions that can be used in BD authoring: playable contents, slideshows, titles, menus, segments, scripts, clips, streams, events, interactive objects, and effects. Other abstractions can be used in BD authoring.

In one implementation, a BD authoring system provides slicing of graphical objects and images for interactive graphics. The BD-ROM Specification allows for Interactive Graphics data to be defined in order to introduce interactivity on BD-ROM discs. Data and commands associated with interactive Buttons and graphics that are displayed, such as on menus, are created using Interactive Graphics.

Figure 6:
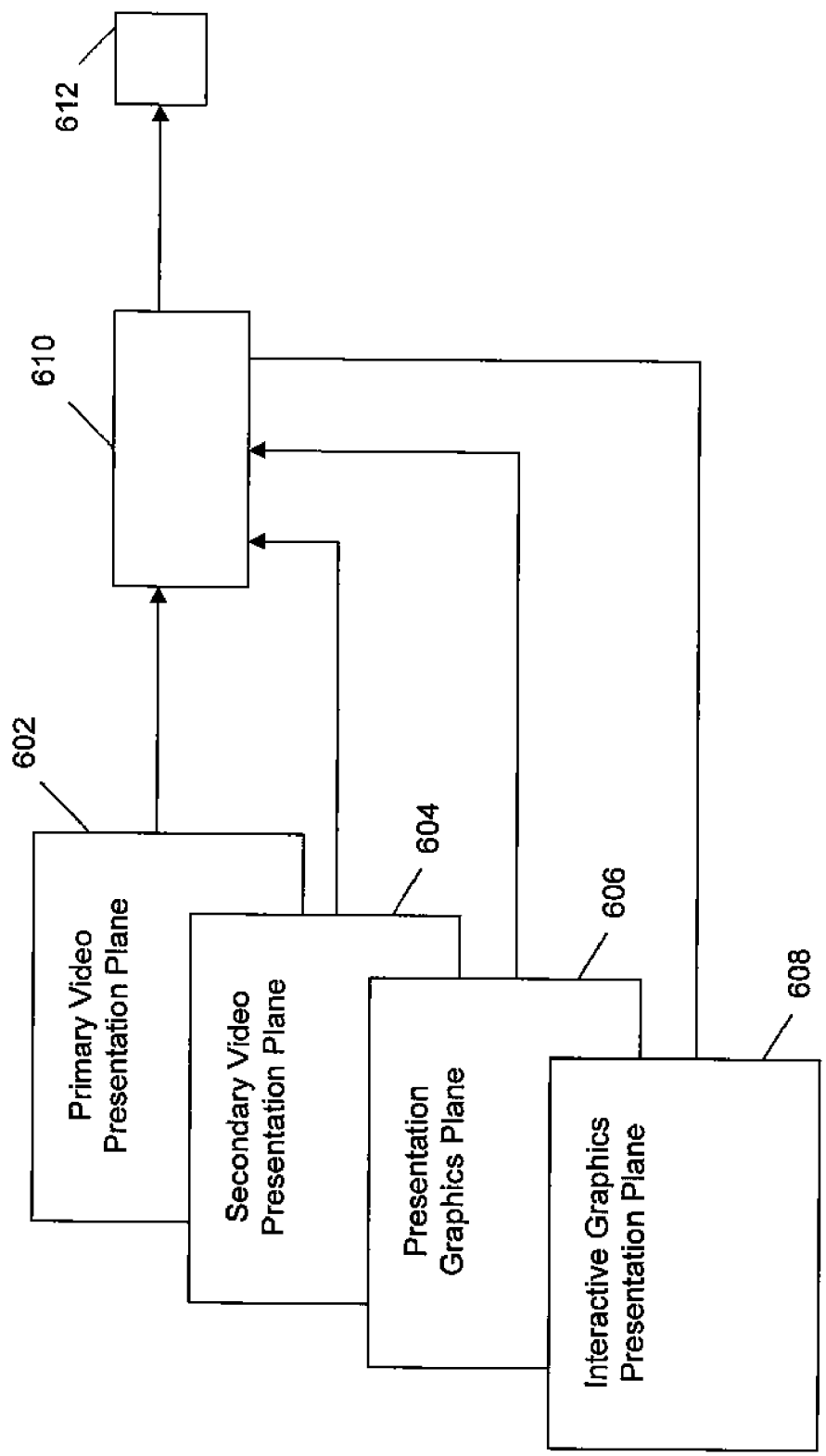
FIG. 6 is a block diagram illustrating a conceptual model to illustrate video overlaying process of the contents in a Clip AV stream file.

FIG. 6 is a block diagram illustrating a conceptual model to illustrate video overlaying process in a Clip AV stream file, as illustrated in FIG. 5. As shown in the example of FIG. 6, there are four presentation planes in movie mode of the BD-ROM specification, a primary video plane 602, a secondary video plane 604, a presentation graphics plane 606, and an interactive graphics plane 608. The four presentation planes are combined in a combining module 610 to produce a composite output 612. The combining module 610 can scale and position the presentation planes during their combination into the composite output 612.

In other implementations, there can be different numbers of presentation planes. For example, in Java mode there is also a background plane brings the number of planes to five. Likewise, there could be only a primary video presentation plane 602. Likewise, there could be a primary video presentation plane 602 and a presentation graphics plane 606. In this manner, there can be any number of presentation planes used when presenting a clip. Also, other types of presentation planes can be included, for example, there can be a background image plane, or picture-in-picture plane, or other types of presentation planes.

Figure 7:
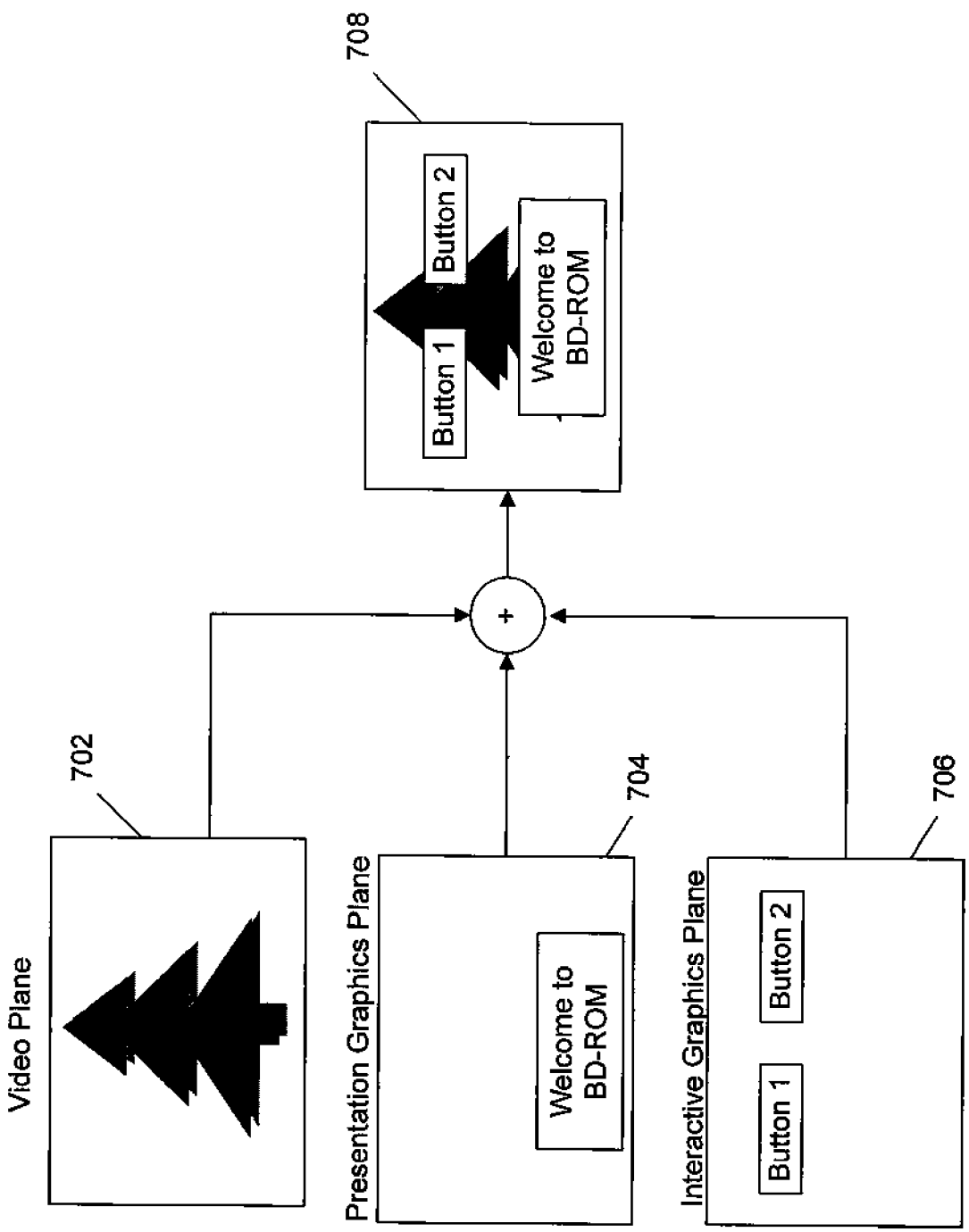
FIG. 7 is another diagram illustrating the combination of presentation planes into a composite output.

FIG. 7 is another diagram illustrating the combination of presentation planes into a composite output. In the example of FIG. 7 there are three presentation planes, a video plane 702, a presentation graphic plane 704, and an interactive graphic plane 706. The three planes are combined into a composite output 708. In this example, the video plane 702 is running in the background, and the presentation graphics plane 704 and the interactive graphics plane 706 overlay the video plane 702.

According to the BD-ROM Specification the way to display interactive graphics, or data, in Movie Mode is to make Button structures out of all the visible graphics in the interactive graphics plane. That is, in accordance with the BD-ROM specification, all interactive graphics, and graphical data other than video and subtitles that is to be displayed needs to be defined as Button structures. In some interactive displays there may be graphic elements that are desired to be displayed but that are not to be interactive. For example, an interactive display may include graphic elements to enhance the presentation, but some of the graphic elements may not have any interactivity associated with them. However, to be included within the interactive display, the non-interactive graphic elements need to be converted to Buttons, like the interactive graphic elements, so that they will be rendered on the interactive graphics plane and displayed on the screen. Although included within the interactive display, these non-interactive Buttons have no associated command.

A button typically has three states: Normal, Select, and Activate. The normal state is shown when the button is not in focus and is simply one of the graphical objects on the screen. When the mouse is placed over the button or the button is navigated to using the arrow keys such as up/down/left/right, the button state is switched to "selected". At this point, a different graphic is shown for that button as compared to the normal state graphic. The activated state is where the button is executed either by clicking on it using the mouse or by pressing enter on the remote while the button is in selected state.

The BD authoring system described includes the ability to allow a user to define a graphic, and then to have the user define what areas of the graphic are interactive. The user defines interactive regions of the graphic display by identifying, or defining, Buttons and then associating commands with the Button. Once the user has created the Buttons the BD authoring system will automatically convert all visible graphical areas that have not already been defined as Buttons into "non-interactive Buttons." Although referred to as "non-interactive Buttons", these Buttons will be displayed as part of the interactive graphics display, and are not usually included in a list of interactive Buttons and their associated commands. Using non-interactive Buttons allows all desired visible portions of the graphic to be displayed.

In addition, a user can define a region of the screen as a non-interactive Button, which does not have a "Button" graphic in it. For example, the user can define a Button that looks like a part of a graphic, or is completely transparent, and so the background video is shown instead of a graphical image. Then as a user moves a mouse and moves over the portion of the display, or navigates using arrow keys to the portion of the display, the button may be activated without giving a visual cue as to its existence. This type of "Easter Egg" button can be displayed in response to different actions by the user, or in response to different events, to provide another technique for user interaction.

Figure 8:
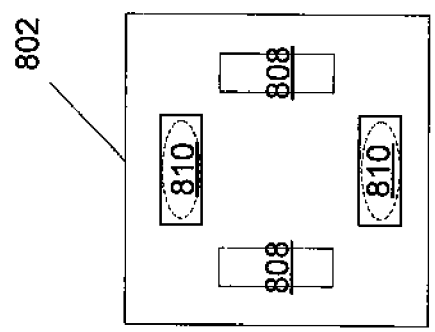
FIG. 8 is a diagram illustrating an example of a flow for creating Buttons.
Figure 8:
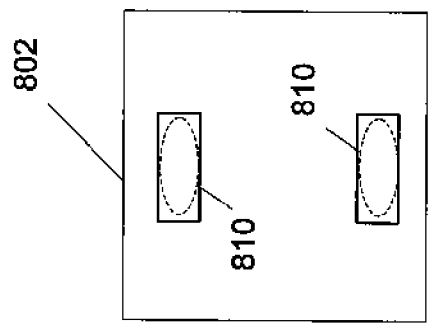
Figure 8:
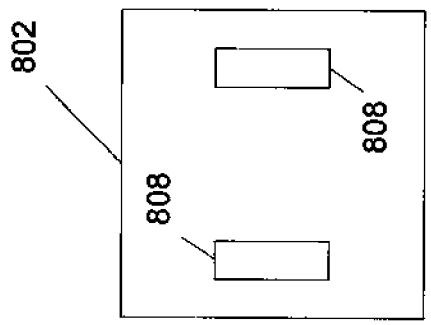
Figure 8:
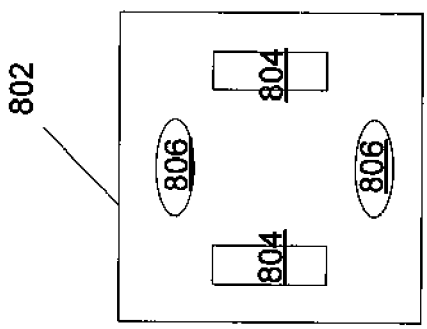

FIG. 8 is a diagram illustrating an example of a flow for creating Buttons. A graphic 802 for an interactive display is generated. The graphic 802 can be generated in many different ways, for example, the graphic can be generated by an artist who builds up the graphic 802 as a composite image, or the graphic could be an image, such as a photograph, or any other type of graphic. Using the BD authoring system, regions of the graphic 802 are identified as interactive regions 804 by identifying, or defining, the regions by Buttons 808. Multiple regions of the graphic 802 can be identified as interactive regions 804 by identifying, or defining, additional regions by Buttons 808. Portions of the graphic 802 that are desired to be display, but that are non-interactive regions 806 are defined. These non-interactive regions 806 of the graphic 802 are defined as non-interactive Buttons 810. Multiple regions of the graphic 802 can be identified as non-interactive regions 806 by identifying, or defining, additional regions by non-interactive Buttons 810. An interactive graphics presentation plane 812 includes, and displays, both the Buttons 808 and the non-interactive Buttons 810.

A typical scenario is to provide a graphic image 802 that is the size of the full screen. The graphic image 802 is entered into the BDAS and, when placed on top of a video, button areas 804 that are interactive are defined on the graphic image 802 by drawing marquees that represent the location and size of the buttons. Without auto-slicing, the author has to draw rectangular marquees of all visible areas, both interactive 804 and non-interactive 806, of the graphics image 802, making sure that no area is left out. All the buttons must be aligned to each other so as not to leave gaps which show up as missing graphical images on the screen.

Because all graphics that are displayed within the interactive graphics presentation plane 812 are defined either as clickable-Buttons or as non-interactive Buttons, it can be burdensome for a user to manually define all of the regions of the graphic, particularly when the graphic has many non-interactive regions. To address this, the BD authoring system allows the user to define Buttons for the regions of the graphic where there is interactivity, as well as any non-interactive region the user desires to define, and then the BD authoring system can automatically identify the remaining portions or regions of the graphic as non-interactive Buttons. As noted, a region defined as a non-interactive Button will be included within the interactive graphic presentation plane 812, but there will be no command associated with the non-interactive Button.

Figure 9:
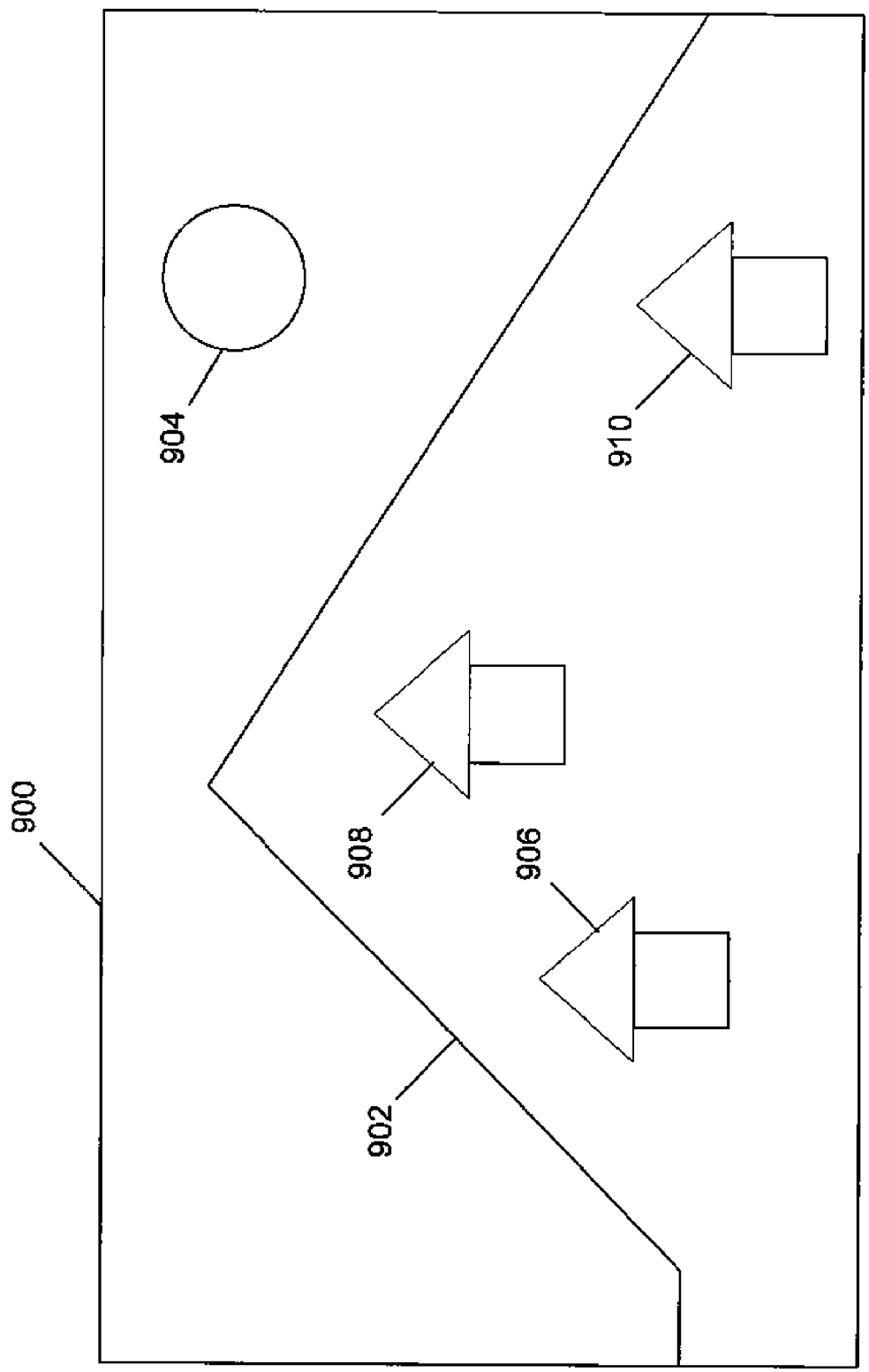
FIG. 9 illustrates an example composition for use as an interactive display where only portions of the composition will be interactive.

FIG. 9 illustrates an example composition 900 for use as an interactive display where only portions of the composition will be interactive. In the example of FIG. 9, the composition is a graphic of a mountain 902, the Sun 904, and three houses 906, 908, and 910. In this example the three houses 906, 908, and 910 are interactive regions of the composition. For example, the first house 906 can be associated with a "Play" command, the second house 908 associated with an "Audio" command, and the third house 910 associated with a "Special Features" command. The user can identify the three houses 906, 908, and 910 as Buttons and associate the desired command with each Button.

Figure 10B:
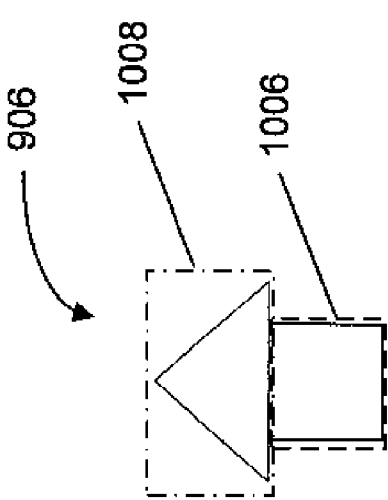
FIG. 10B is a diagram illustrating further detail of another example of defining a Button region for the first graphic.
Figure 10A:
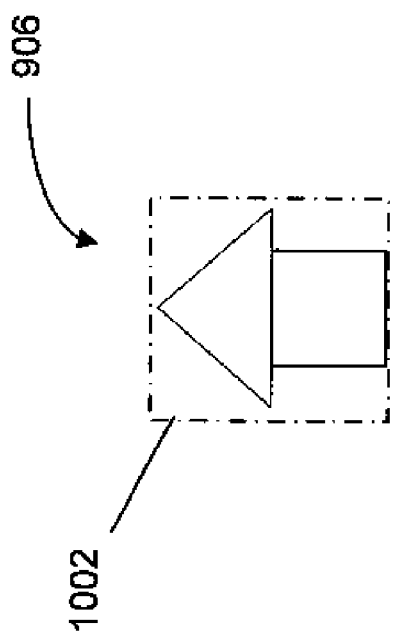
FIG. 10A is a diagram illustrating further detail of an example of defining a Button region for a first graphic.

FIGS. 10A and 10B are diagrams illustrating further detail of defining a Button region for a first house graphic 906. Typically, Buttons are defined as rectangular regions. As shown in FIG. 10A, the house graphic 906 can be defined as one large rectangular region 1002. FIG. 10B illustrates another example of defining the house graphic 906. As shown in FIG. 10B, the house 906 can be defined as two smaller rectangular regions 1006 and 1008. As shown in FIG. 10A there is one "clickable" region 1002 and in FIG. 10B there are two clickable regions 1006 and 1008.

There are several considerations to be noted in selecting between the examples illustrated in FIGS. 10A and 10B. If the house graphic 906 is defined as a single Button, as illustrated in FIG. 10A, then there is a single "Play" command. If the house is defined as two rectangular regions, as illustrated in FIG. 10B, then the same "Play" command would be associated with both Buttons. In addition, the single Button definition of FIG. 10A supports up/down/left/right Button action for the user to navigate the menu more easily than the two button definition of FIG. 10B.

Returning to FIG. 9, it is desired that the regions of the composition other than the houses 906, 908, and 910 be included in the interactive graphics presentation layer so that the entire composition is displayed. However, there are no commands associated with these other regions. As noted, to be include in the interactive display, all display regions need to be defined as a Button. To reduce the burden on the user in defining all of the non-interactive regions of the display, the non-interactive regions of the display are automatically defined, or "sliced" into "non-interactive Buttons" by the BD authoring system. The authoring system automatically places the same image in the Normal, Select, and Activate states of the button so that if the user clicks on the button, the image does not change. This gives the appearance of a truly non-interactive button.

Figure 11:
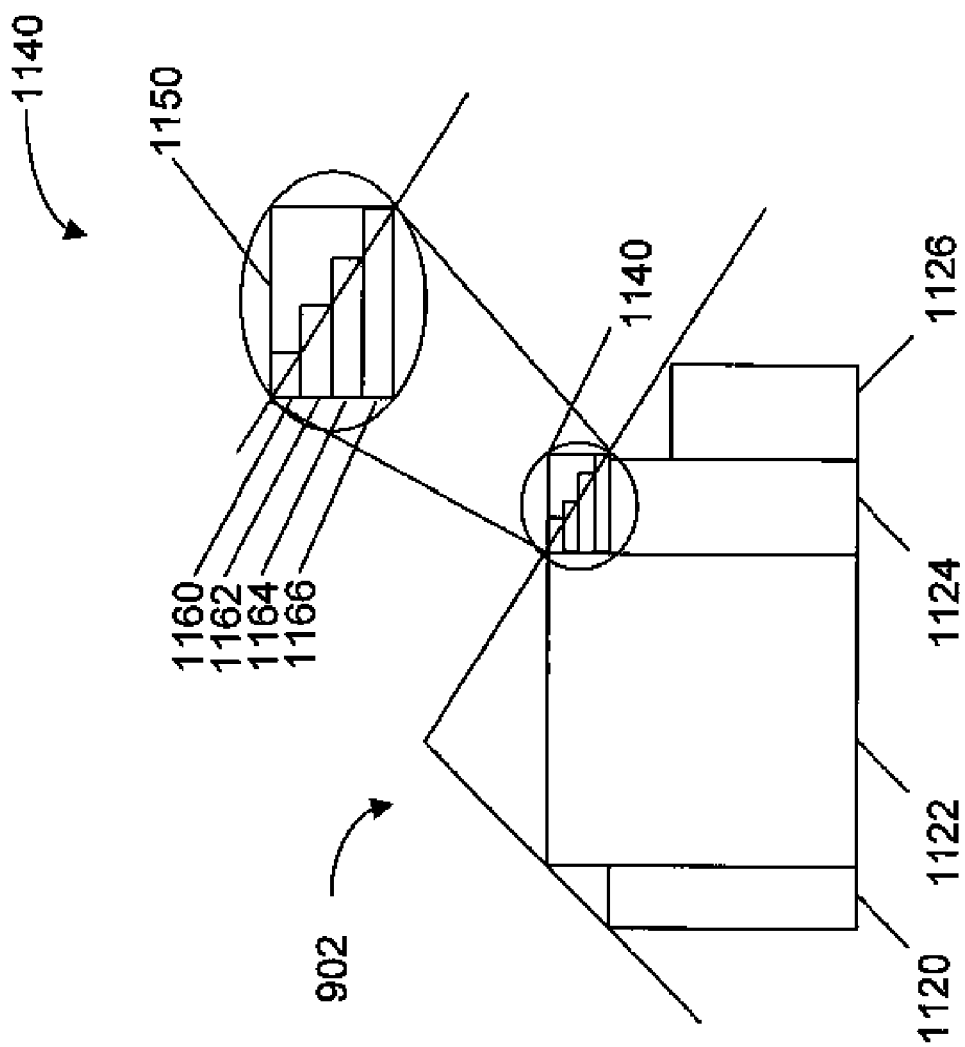
FIG. 11 illustrates an example of defining a non-rectangular region with rectangular Buttons.

During the automatic definition of non-interactive Buttons, or "slicing", there is a trade off between the number of non-interactive Buttons used to define a region and the memory size of the Buttons. FIG. 11 is a diagram illustrating further detail of automatically defining a non-interactive Button region for a portion of the mountain graphic 902 of FIG. 9. FIG. 11 illustrates defining a non-rectangular region with rectangular non-interactive Buttons. As shown in FIG. 11, the mountain 902 is basically a triangular shape. In one implementation, the mountain region can be defined by rectangular regions 1120, 1122, 1124 and 1126 whose outer corners just touch the boundary of the triangular region of the mountain 902.

Included in FIG. 11 is a blowup of a region 1140 where there is a gap between the rectangular Buttons 1122 and 1124 and the boundary of the mountain region 902. The blowup of region 1140 illustrates that it can be represented by a single rectangular button 1150, or by four rectangular buttons 1160, 1162, 1164, and 1166. As the blowup of region 1140 illustrates, there is a tradeoff between defining non-rectangular regions with fewer large Buttons compared to more small Buttons.

Each button consumes two types of memory. The characteristics of the button such as position, size and state definition consumer one type and the actual graphical image in the button consumes a second type of memory. Typically, there are constraints on each type of memory. Using fewer large Buttons decreases the amount of memory required for Button definition, but increases the graphic memory required to represent the Button. Likewise, using more small Buttons increases the amount of memory required for Button definition, but decreases the graphic memory required to represent the Buttons.

Figure 12A:
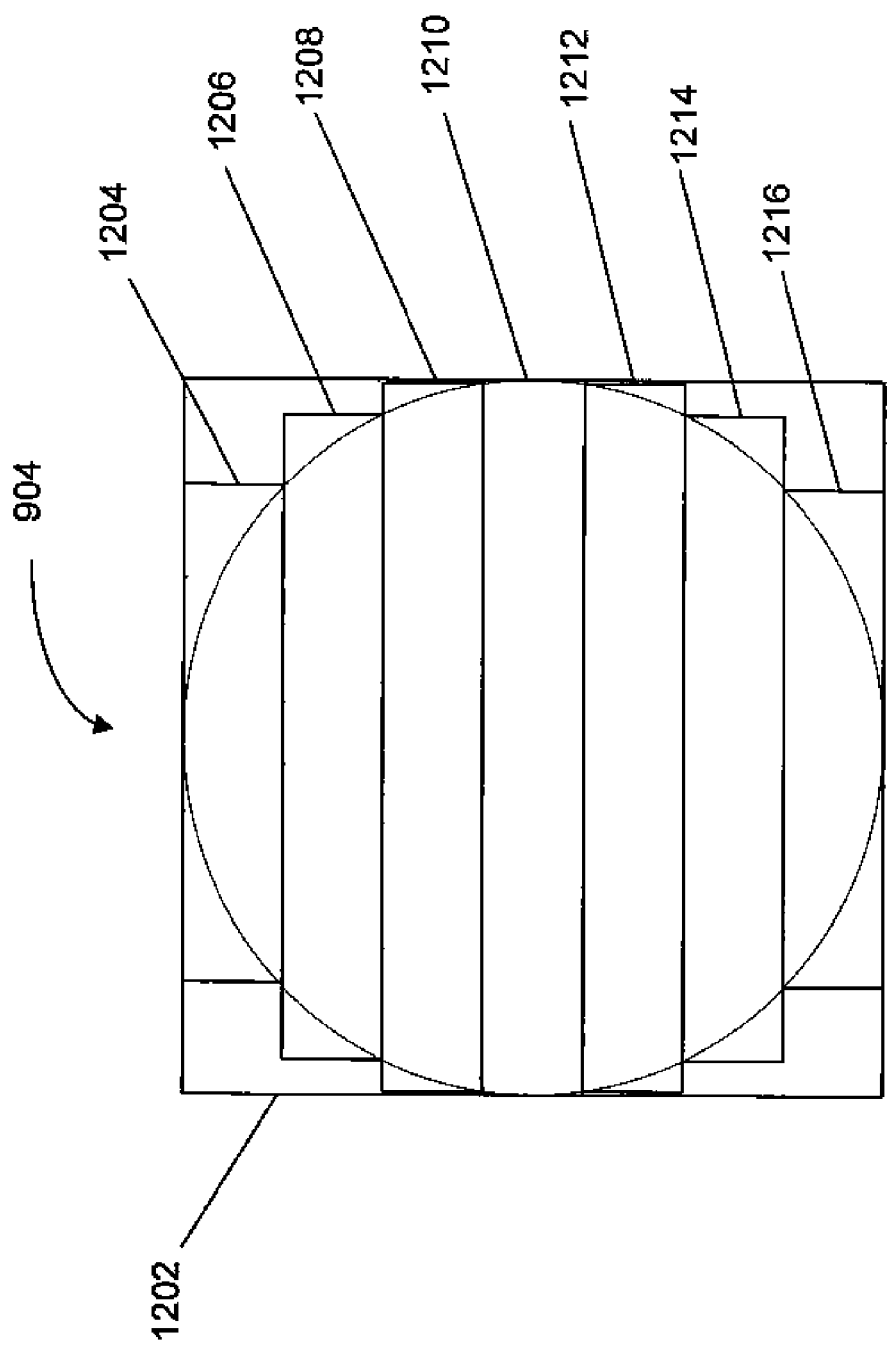
FIG. 12A illustrates another example of defining a non-rectangular region with rectangular Buttons.

FIG. 12A is a diagram illustrating further detail of automatically defining a non-interactive Button region for sun graphic 904 of FIG. 9. As shown in FIG. 12A, the sun graphic 904 is basically a circular shape. In one implementation, the sun graphic 904 can be defined by a single rectangular region 1202. In another implementation, the sun graphic 904 can be defined as multiple rectangular regions 1204-1216. It is noted that increasing the number of rectangles reduces the total amount of image data used to represent the circle but requires an increase in the number of buttons defined.

Figure 12B:
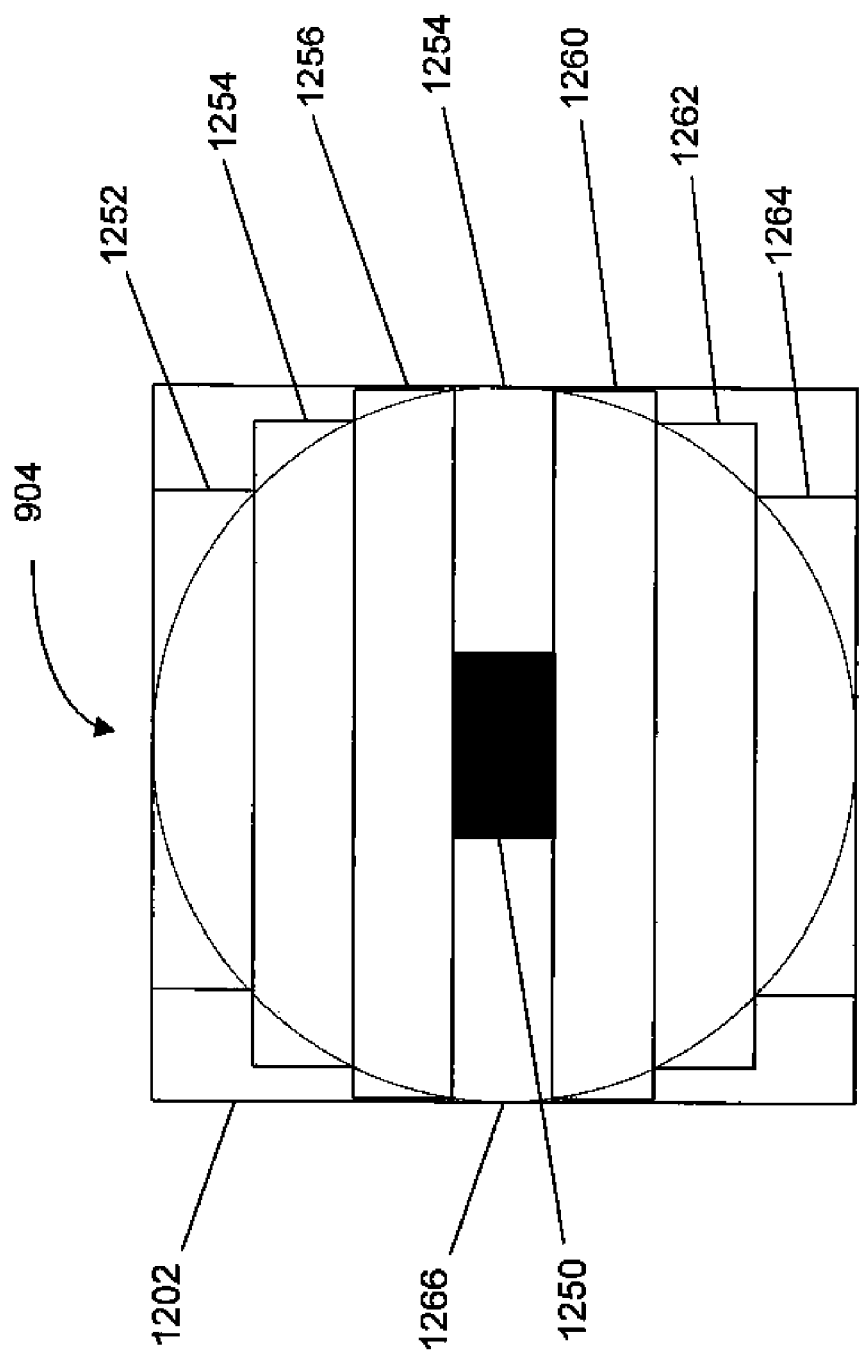
FIG. 12B illustrates an example of combining buttons associated with commands with buttons not associated with commands.

Interactive buttons can be included within a portion of a graphic, and non-interactive buttons can be automatically defined for the remainder of the graphic. FIG. 12B illustrates an example of combining buttons associated with commands with buttons not associated with commands. For example, FIG. 12B illustrates the sun graphic 904 with an interactive Button 1250 defined at the center of the circle. The rest of the non-interactive buttons 1252-1266 are automatically defined by the authoring system as non-interactive Buttons.

As noted above, there is a tradeoff between defining non-rectangular regions with fewer large Buttons compared to more small Buttons. Using fewer large Buttons decreases the amount of memory required for Button definition, but increases the graphic memory required to represent the Button. Likewise, using more small Buttons increases the amount of memory required for Button definition, but decreases the graphic memory required to represent the Buttons.

The automatically defined Buttons, or non-interactive Buttons, can be created in a substantially efficient manner. That is, an efficient balance can be achieved, or approached, balancing the number of non-interactive Buttons and the total area of the non-interactive Buttons. The BD authoring system allows a user to choose if this operation happens. In the BD authoring system described, the user can provide input to the automatic Buttoning system related to the trade-off of number of non-interactive Buttons to the size of the non-interactive Buttons.

In another implementation, a BDAS provides efficient bounding rectangles using a rectangle technique. Using this technique, a number of objects are positioned on a defined area. Then, bounding rectangles of the objects are considered and the system determines either one or two non-overlapping rectangles such that the rectangles encompass all the objects and the combined area of the rectangles is a minimum area necessary in order to encompass the objects. The BDAS can either output one or two rectangles depending on what is more efficient. For BD-ROM discs, this technique can be used to find the Window Structures for an Epoch.

In one implementation, the BDAS uses the following steps for bounding rectangles: Given a set of rectangles (S1) find a set of up to two non-overlapping rectangles (S2) such that: (a) all the rectangles in S1 are contained in the rectangle(s) in S2; and (b) the sum of the areas of the rectangle(s) in S2 is minimized. A smallest bounding rectangle (SBR) is the smallest rectangle that can encompass all given rectangles in a set S. The SBR can be found by expressing each rectangle in S as a pair of coordinates for the upper left corner (Top, Left) of the Rectangle and the lower right corner (Bottom, Right) of the Rectangle. The SBR is then given by the coordinates as SBR (Top, Left), SBR (Bottom, Right). The terms are defined as follows: "Top" is the Minimum Top for all Rectangles in S; "Left" is the Minimum Left for all Rectangles in S; "Bottom" is the Maximum Bottom for all Rectangles in S; and "Right" is the Maximum Right for all Rectangles in S.

The BDAS then performs following steps:

(1) assume the best answer is that there is only one rectangle required in S2 and this is the Smallest Bounding Rectangle (SBR) for all the Rectangles in S1. This solution is currently set as the best known solution.

(2) It there is a two Rectangle solution that is better than the one Rectangle solution, then the two Rectangle solution is composed of the SBRs of two groups such that all the Rectangles of S1 are in one of the two groups and that the two SBRs do not intersect.

(3) The technique considers other possible groups and their SBRs and determines a solution that has the least sum of the area of the SBRs.

(4) Typically, there are a large number of groups that need to be considered, but usually there are only a few that result in a non-overlapping set of SBRs.

(5) Check those groups that might result in non-overlapping SBRs. If a set of rectangles can successfully be distributed into two groups such that the SBRs for the two groups are not overlapping, then there is either a vertical or a horizontal line that can be drawn that does not intersect any of the rectangles in the two groups. It is noted that a line along the edge is okay and is not qualified as intersecting for the purposes of this technique.

(6) Candidate groups are those groups that have either a vertical or a horizontal line that does not intersect any of the rectangles, thereby dividing the set of rectangles into two parts. The groups for a vertical line would be the left rectangles and the right rectangles, and the groups for a horizontal line would be the top rectangles and the bottom rectangles.

(7) The following lines are considered: (i) vertical lines that pass through the Left or the Right of a rectangle for all rectangles in S1 such that this line does not intersect any of the other rectangles in S1; and (ii) Horizontal lines that pass through the Top or the Bottom of a rectangle for all rectangles in S1 such that this line does not intersect any of the other rectangles in S1.

(8) For each of the candidate lines identified in the step above, calculate the SBR of the two groups created by the line and if the sum of the areas of the SBRs is better than the sum of the areas of the SBRs in the best known solution (there may be only one SBR in the best known solution) then this new solution is marked as the best known solution.

(9) The SBRs in the best known solution are returned as the solution rectangles in S2.

In another implementation, the system can suggest a breakup of one or more of the existing objects and suggest rectangles so that the area of those rectangles is less than the best solution (areas of bounding rectangles) with the objects in their non-broken states.

Figure 13:
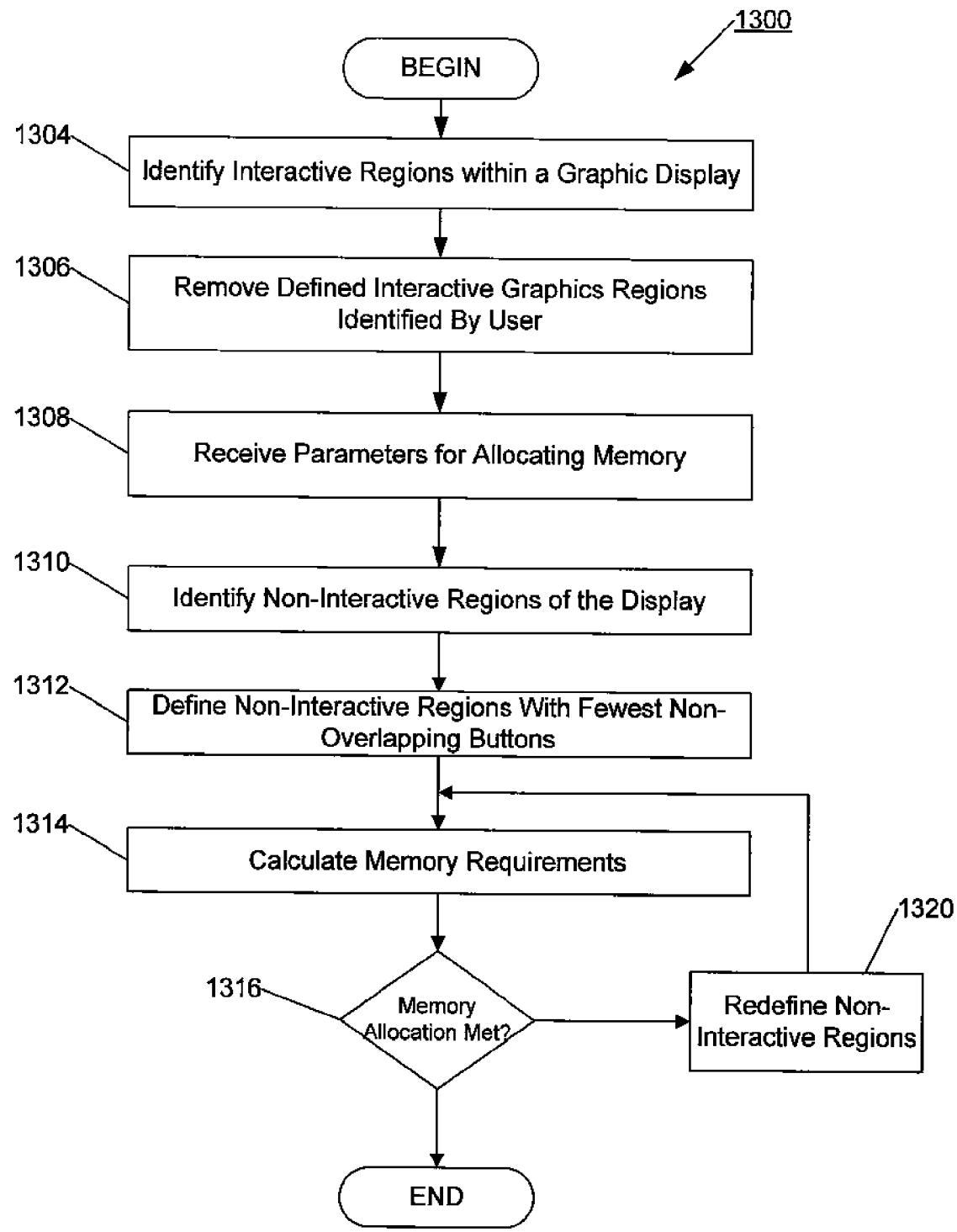
FIG. 13 is a flow diagram of an example method of slicing non-interactive graphic regions into non-interactive Buttons.

FIG. 13 is a flow diagram of a method of slicing non-interactive graphic regions into non-interactive Buttons. A user initially identifies, at block 1304, interactive regions within a graphic display that is to be used for an interactive graphic display. User defined interactive graphic regions, or user defined Buttons, are removed from the graphic region at block 1306. The user defined Buttons can include both interactive and non-interactive Buttons. The user can then provide parameters for allocating memory during slicing of non-interactive regions of the graphic region at block 1308. If no user input is provided, then a set of default parameters for memory allocation can be utilized.

The remaining, non-interactive regions of the display are identified at block 1310. Then, at block 1312, the non-interactive regions are partitioned into non-overlapping rectangular regions, or Buttons. The non-overlapping rectangular regions are initially selected so that the fewest number of rectangular regions define the non-interactive regions of the display. The amount of memory needed to store the Button definitions and the amount of graphic memory needed to represent the Buttons is calculated at block 1314. At Block 1316, the amount of memory needed for Button definition and representation is compared to the memory allocation requirements. If the amount of memory needed satisfies the memory allocation (i.e., a positive outcome), then flow ends. Otherwise, if the amount of memory needed does not satisfy the memory allocation (i.e., a negative outcome), then the non-interactive region of the display are redefined with an increased number of non-overlapping rectangles. Flow then continues to Block 1314 where the amount of memory needed to define and represent the Buttons is again calculated.

An image may be analyzed as to which areas of the image are non-transparent. If a pixel has a transparency value of 0, which means that the image has no visual impact, then it is qualified as fully transparent. All remaining areas are divided up into rectangles the size and number of which is determined by the slicing efficiency ratio.

In the discussion above, the Button regions were restricted to rectangular regions. In other implementations, other shapes can be used to define Button regions. For example, Button regions could include circular regions, or triangular regions, polygon regions, or other user-defined regions. In addition, more than one shaped region can be used to define buttons in the same composition.

In one implementation, the BD authoring system allows the Button Abstraction to be classified into the following types: (a) Drawn, or defined, by user and shown in object lists (first level lists); (b) Drawn by user and not shown in object lists; (c) Automatically generated and not shown in object lists; and (d) Automatically generated by the system and then converted to a user accessible Button (and shown in the list).

The list of Buttons can be presented to the user in different formats, for example, as a list that will allow the user to edit, or change, the different buttons.

Figure 14A:
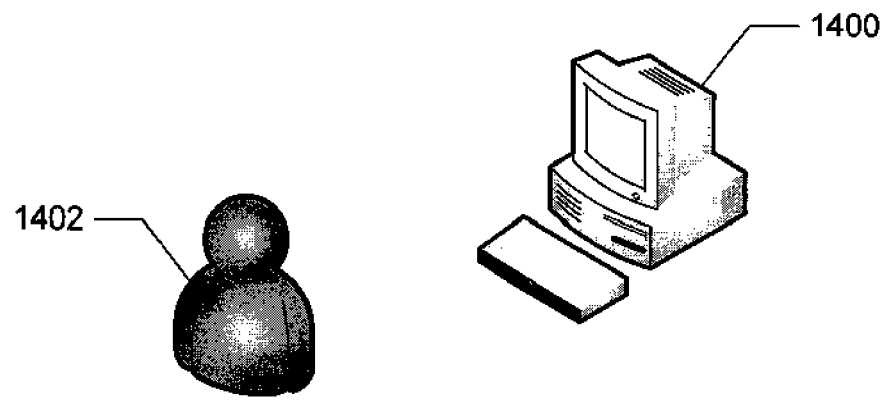
FIG. 14A shows a representation of a computer system and a user.

FIG. 14A shows a representation of a computer system 1400 and a user 1402. The user 1402 can use the computer system 1400 to author a Blu-ray disc. The computer system 1400 stores and executes a BD authoring system 1412 (shown in FIG. 14B), which receives BD-ROM data as an input and outputs an abstraction of the BD-ROM data. In one example, the BD authoring system 1412 provides slicing for interactive graphics.

Figure 14B:
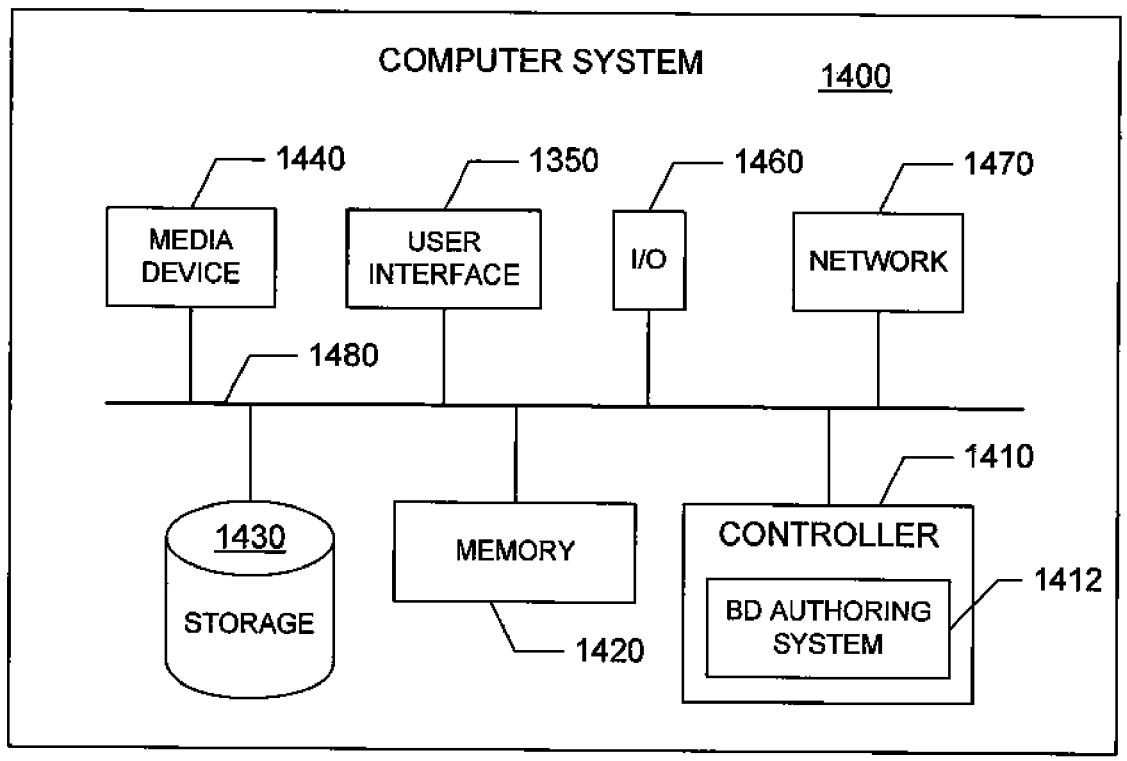
FIG. 14B shows a block diagram of one implementation of the computer system in FIG. 23A, including the BD authoring system.

FIG. 14B shows a block diagram of one implementation of the computer system 1400 in FIG. 14A, including the BD authoring system 1412. The computer system 1400 includes a controller 1410, a memory 1420, storage 1430, a media device 1440, a participant interface 1450, an input/output (I/O) interface 1460, and a network interface 1470. These components are interconnected by a common bus 1480. Alternatively, different connection configurations can be used, such as a star pattern with the controller at the center.

The controller 1410 is a programmable processor and controls the operation of the computer system 1400 and its components. The controller 1410 loads instructions from the memory 1420 or an embedded controller memory (not shown) and executes these instructions to control the system. In its execution, the controller 1410 provides the BD authoring system 1412 as a software system. Alternatively, this service can be implemented as separate components in the controller 1410 or the computer system 1400.

Memory 1420 stores data temporarily for use by the other components of the computer system 1400. In one implementation, memory 1420 is implemented as RAM. In one implementation, memory 1420 also includes long-term or permanent memory, such as flash memory and/or ROM.

Storage 1430 stores data temporarily or long term for use by other components of the computer system 1400, such as for storing BD data used by the BD authoring system 1412. In one implementation, storage 1430 is a hard disk drive.

The media device 1440 receives removable media and reads and/or writes data to the inserted media. In one implementation, the media device 1440 is an optical disc drive.

The user interface 1450 includes components for accepting user input from the user of the computer system 1400 and presenting information to the user. In one implementation, the user interface 1450 includes a keyboard, a mouse, audio speakers, and a display. The controller 1410 uses input from the user to adjust the operation of the computer system 1400.

The I/O interface 1460 includes one or more I/O ports to connect to corresponding I/O devices, such as external storage or supplemental devices (e.g., a printer or a PDA). In one implementation, the ports of the I/O interface 1460 include ports such as: USB ports, PCMCIA ports, serial ports, and/or parallel ports. In another implementation, the I/O interface 1460 includes a wireless interface for communication with external devices wirelessly.

The network interface 1470 includes a wired and/or wireless network connection, such as an RJ-45 or "Wi-Fi" interface (802.11) supporting an Ethernet connection.

The computer system 1400 includes additional hardware and software typical of computer systems (e.g., power, cooling, operating system), though these components are not specifically shown in FIG. 14B for simplicity. In other implementations, different configurations of the computer system can be used (e.g., different bus or storage configurations or a multi-processor configuration).

Various illustrative implementations of the present invention have been described. However, one of ordinary skill in the art will recognize that additional implementations are also possible and within the scope of the present invention. For example, although the disc authoring system has been described exclusively in terms of the BD format, the system can be used to author discs in formats other than the BD format (e.g., the HD-DVD format).

Accordingly, the present invention is not limited to only those implementations described above.

What is claimed is:

1. A method for authoring a Blu-ray Disc, the method comprising:
   defining interactive regions within a composition with buttons and associating commands with the buttons;
   automatically slicing non-interactive regions within the composition with buttons,
   wherein the non-interactive regions are not associated with any commands but allows all desired visible portions of a graphical region to be displayed; and
   associating interactive and non-interactive regions with an interactive presentation plane, which includes and displays both interactive and non-interactive buttons.

2. The method of claim 1, wherein automatically defining non-interactive regions is efficiently configured in accordance with a memory allocation.

3. The method of claim 1, wherein the interactive presentation plane is included within an audio/video stream.

4. The method of claim 1, wherein the interactive presentation plane is scaled.

5. The method of claim 4, wherein the scaled interactive presentation plane is included within an audio/video stream.

6. The method of claim 1, wherein the interactive presentation plane overlays a video presentation plane.

7. A Blu-ray Disc authoring system, comprising elements that:
   define interactive regions within a composition with buttons and commands associated with the buttons;
   automatically slice non-interactive regions within the composition,
   wherein the non-interactive regions are not associated with any commands but allows all desired visible portions of a graphical region to be displayed; and
   associate interactive and non-interactive regions with an interactive presentation plane.

8. The system of claim 7, wherein the non-interactive regions are not associated with any command.

9. A method for defining an interactive graphic for a Blu-ray Disc, the method comprising:
   identifying an interactive graphics display;
   identifying interactive regions within the display and associating a command with each respective interactive region;
   identifying non-interactive regions within the display;
   automatically defining portions of the non-interactive regions, which are not associated with any commands but allows all desired visible portions of a graphical region to be displayed, into partitions,
   wherein the interactive and non-interactive regions comprise and interactive composition; and
   associating interactive and non-interactive regions with an interactive presentation plane.

10. The method of claim 9, wherein there is no command associated with the non-interactive regions within the display.

11. The method of claim 9, wherein automatically defining portions of the non-interactive region into partitions is efficiently configured according to a memory allocation.

12. The method of claim 9, wherein the partitions are rectangular shaped.

13. The method of claim 9, wherein the partitions are non-rectangular shaped.

14. An apparatus for authoring a Blu-ray Disc, the apparatus comprising:
   means for defining interactive regions within a compositions with buttons and associating commands with the buttons;
   means for automatically slicing non-interactive regions within the composition with buttons,
   wherein the non-interactive regions are not associated with any commands but allows all desired visible portions of a graphical region to be displayed; and
   means for associating interactive and non-interactive regions with an interactive presentation plane.

15. An apparatus for defining an interactive graphic for a Blu-ray Disc, the apparatus comprising:
   means for identifying an interactive graphics display;
   means for identifying interactive regions within the display and associating a command with each respective region;
   means for identifying non-interactive regions within the display; and
   means for automatically slicing portions of the non-interactive regions into partitions to allow all desired visible portions of a graphical region to be displayed,
   wherein the interactive an non-interactive regions comprise an interactive graphics presentation plane.

16. A computer-readable non transitory storage medium storing a computer program, for authoring a Blu-ray Disc, the program comprising executable instructions that cause a computer to:
   receive input defining interactive regions within a composition with buttons and associating commands with the buttons;
   automatically define non-interactive regions within the composition with buttons,
   wherein the non-interactive regions are not associated with any command but allows all desired visible portions of a graphical region to be displayed; and
   associating interactive and non-interactive regions with an interactive presentation plane.

17. A computer-readable non transitory storage medium storing a computer program, for authoring a Blu-ray Disc, the program comprising executable instructions that cause a computer to:
   receive definitions identifying interactive regions within the display, and commands associated with each respective region; and
   identify non-interactive regions within the display and automatically define portions of the non-interactive regions into partitions to allow all desired visible portions of a graphical region to be displayed,
   wherein the interactive and non-interactive regions comprise an interactive composition.

* * * * *